Patented Sept. 3, 1935

2,013,182

UNITED STATES PATENT OFFICE 2,013,182

ARYLAMINO-HYDROXYBENZENE AND PROCESS OF PREPARING IT

Leopold Laska, Oskar Haller, and Arthur Werdermann, Offenbach-on-the-Main, Germany, assignors to General Aniline Works, Inc., New York, N. Y., a corporation of Delaware No Drawing. Application January 18, 1934, Serial No. 707,220. In Germany January 20, 1933

8 Claims. (Cl. 260—128)

The present invention relates to condensation products from phloroglucine with primary aromatic amines and to a process of preparing them; more particularly it relates to the manufacture of compounds of the following probable general formula:

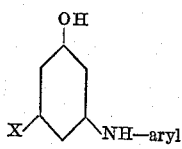

wherein X represents —OH or the group

—NH—aryl, by heating phloroglucine with aromatic amines in the presence of water and, if necessary, in the presence of acids, in which latter case the formation of triarylaminobenzenes is avoided by suitably choosing the amounts of amines and the acid added, as well as the duration of heating.

In "Berichte der deutschen chemischen Gesellschaft", vol. 23, 1890), Referateband, page 488, Minunni describes a process of preparing symmetrical di-(phenylamino)-hydroxybenzene or di-(para-tolylamino)-hydroxybenzene, which consists in heating for 6 hours 1 mol. of phloroglucine with 2 mols. of para-toluidine or aniline in a closed vessel to 140° C. to 150° C. But Minunni himself states that by this process the said products are obtained with a yield of only 40% of the theoretical amount. Obviously, Minunni has used anhydrous phloroglucine.

Now, we have found that there are obtained with an excellent yield from phloroglucine and aromatic amines condensation products which still contain at least one hydroxyl group of the phloroglucine nucleus, by heating phloroglucine and aromatic amines in the presence of water. Furthermore, we have found that the condensation of phloroglucine with aromatic amines may also be performed in the presence of a mineral acid. In this case the basicity of the aromatic amine used greatly influences the course of the reaction. The application of acid as condensation agent in the present method of working is advisable in case phloroglucine is to be condensed with amines having substituents of a more strongly negative action. By using a large excess of stronger bases, there are easily formed, in the presence of acid, tri-arylamino-benzenes. By suitably choosing the amounts of such an amine and of the acid added, as well as the duration of the heating, good yields of arylaminohydroxybenzenes may be obtained. It is of great importance that it is possible, according to the present process, to condense phloroglucine with nitroarylamines, for instance, para-nitro-aniline, to form 1,3,5-di-(nitrophenylamino)-hydroxybenzenes, and that, by proper attention to the above conditions, i. e. by suitably choosing the quantities of the arylamine and the acid and the duration of heating, phloroglucine may be condensed with strongly negative-substituted arylamines even in the proportion of 1 to 1. This is a course of reaction which Minunni in vain tried to obtain (cf. page 489 of the reference cited).

The quantity of water which is used for the conversion of the reaction components, according to the present process, may vary within wide limits. In some cases the two mols. of water of crystallization which are present in the crystallized phloroglucine are sufficient. The condensation products obtained which represent, according to the reaction conditions and the components used, di-arylamino-mono-hydroxybenzenes or mono-arylamino-dihydroxybenzenes, are valuable intermediates for the production of dyestuffs or other organic compounds. Those among them which are new products are characterized by the following probable general formula:

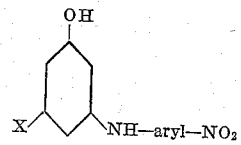

wherein X represents —OH or the group

—NH—aryl-NO$_2$.

The compounds have, in the form of their alkali metal salts, more or less affinity for the vegetable fiber.

The following examples serve to illustrate the invention, but they are not intended to limit it thereto, the parts being by weight:

(1) 40.5 parts of phloroglucine (containing water of crystallization) are dissolved in 500 parts of water and 46.5 parts of aniline are added; the mixture is heated to boiling for 50 hours under reflux. After addition of caustic soda solution until the reaction is alkaline any unchanged aniline is blown off by means of steam, the solution is filtered and the thus formed diphenyl-diamino-hydroxybenzene is precipitated by addition of hydrochloric acid until a neutral reaction is obtained. The diphenyl-diamino-hydroxybenzene is obtained with a yield of 80% and possesses the same properties as that described by Minunni.

In the same manner the condensation products may be obtained from 1 mol. of phloroglucine with 2 mols., respectively of para-toluidine, meta-toluidine, para-anisidine and para-chloraniline.

(2) 40.5 parts of phloroglucine (containing water of crystallization) and 46.5 parts of aniline are heated, while stirring and under reflux, for 8 hours to 100° C. After addition of caustic soda solution, the unchanged aniline is blown off by means of steam, the reaction mixture is allowed to cool and, if necessary, it is neutralized by means of hydrochloric acid. The precipitate formed is filtered by suction and, in order to purify it, dissolved in dilute caustic soda solution, filtered and precipitated by addition of hydrochloric acid until a neutral reaction is obtained. After recrystallization from toluene the diphenyldiamino-hydroxybenzene obtained melts at 110° C. and is identical with the product obtained by Minunni. The yield amounts to 99%.

(3) 40.5 parts of phloroglucine (containing water of crystallization) and 53.5 parts of para-toluidine are heated under reflux in an apparatus provided with a stirrer for 8 hours to 100° C. After addition of caustic soda solution, the unchanged para-toluidine is blown off by means of steam; thereupon, the product is worked up in the same manner as that described in Example 2. The yield of di-(para-tolylamino)-hydroxybenzene amount to 90% of the theoretical.

(4) 40.5 parts of phloroglucine (containing water of crystallization) and 46.5 parts of aniline are heated in an enamelled pressure vessel for 8 hours to 140° C., while stirring. After cooling, caustic alkali solution is added to the reaction mixture, the unchanged aniline is blown off by means of steam and the product is worked up as described in Example 2. The diphenyldiamino-hydroxybenzene is obtained with a yield of 93.7% of the theoretical.

(5) 40.5 parts of phloroglucine (containing water of crystallization) and 53.5 parts of para-toluidine are heated in an enamelled pressure vessel for 8 hours to 140° C. The working up is the same as in Example 4. The di-(para-tolyl-amino)-hydroxybenzene obtained has the same properties as the product obtainable according to Example 3; its yield amounts to 92%.

(6) 162 parts of phloroglucine (containing water of crystallization) are heated in 15 times their weight of water with 190 parts of aniline oil and 25 parts of hydrochloric acid (specific gravity 1.15) for 16 hours under reflux. In order to remove small amounts of aniline, the whole is boiled for a short time with caustic soda solution and the sufficient quantity of water, any undissolved 1,3,5-triphenyl-triamino-benzene is filtered off by suction, the filtrate is neutralized by means of hydrochloric acid and acidified with acetic acid, whereby 1,3,5-di-(phenylamino)-hydroxybenzene precipitates. The yield amounts to 79% of the theoretical, whereas the yield of triphenyl-triaminobenzene amounts to 9% of the theoretical.

In the same manner, there is obtained 1.3.5-di-(4'-methylphenylamino)-hydroxybenzene from phloroglucine and para-toluidine and the 1,3,5-di-(4'-chlorophenylamino)-hydroxybenzene from phloroglucine and para-chloraniline.

(7) 162 parts of phloroglucine (containing water of crystallization) are boiled in 15 times their weight of water with 320 parts of beta-naphthylamine and 25 parts of hydrochloric acid (specific gravity 1.15) for 16 hours under reflux. The reaction product is filtered by suction, comminuted and the small excess of beta-naphthylamine is extracted by means of dilute hydrochloric acid; the product is then dissolved in the necessary amount of alcohol of 66% strength and caustic soda solution, while hot; a small amount of undissolved matter is filtered by suction and the filtrate is acidified with acetic acid, whereby 1,3,5-di-(2'-naphthylamino)-hydroxybenzene separates with a yield of 80% of the theoretical.

(8) 162 parts of phloroglucine (containing water of crystallization) are boiled in 15 times their weight of water with 420 parts of meta-nitroaniline and 112 parts of hydrochloric acid (specific gravity 1.15) for 11 hours, while stirring and under reflux. The reaction product precipitates in the form of a dark red powder. The meta-nitroaniline which has not been reacted upon is extracted by boiling with dilute hydrochloric acid, the residue is washed out well with hot water to which there has been added a small quantity of sodium carbonate, and dried. A red-brown powder is obtained which represents 1,3,5-di-(3'-nitrophenylamino)-hydroxybenzene, melting at 183° C. The yield amounts to 93% of the theoretical.

The body dissolves well in hot dilute caustic soda solution.

(9) 162 parts of phloroglucine (containing water of crystallization) are boiled in 15 times their weight of water with 280 parts of para-nitroaniline and 102 parts of hydrochloric acid (specific gravity 1.15) or the equivalent amount of sulfuric acid for 16 hours, while stirring and under reflux. The red powdery magma is extracted, several times with boiling dilute sodium carbonate solution. A small quantity of para-nitroaniline which has not been reacted upon precipitates from the combined filtrates after cooling. This is removed by filtration and by acidification with acetic acid, the 1,3,5-(4'-nitrophenylamino)-dihydroxybenzene separates from the alkaline filtrate in the form of a red powder. It melts at 205° C., dissolves in hot water and dilute sodium carbonate solution. The yield amounts to 39% of the theoretical (calculated upon phloroglucine). The residue which is insoluble in the dilute sodium carbonate solution represents, after washing out and drying, 1,3,5-di-(4'-nitrophenylamino)-hydroxybenzene, being a brick-red powder which melts above 270° C. and dissolves easily in alcoholic caustic soda solution. The yield amounts to 48.6% of the theoretical (calculated upon phloroglucine).

By using in this example twice the quantity of paranitroaniline and of hydrochloric acid and working otherwise in the same manner as described above, 1,3,5-di-(4'-nitrophenylamino)-hydroxybenzene is obtained with a yield of 91% of the theoretical. Tri-(4'-nitrophenylamino)-benzene is not formed.

According to the statements in Examples 8 and 9, there is obtained from phloroglucine and 4-nitro-2-amino-methoxybenzene the 1,3,5 - di - (4 - nitromethoxyphenyl-2'-amino)-hydroxybenzene—being a brown-red powder melting at 229° C.

5-nitro-2-amino-methoxybenzene the 1,3,5 - di - (5'-nitromethoxyphenyl-2'-amino)-hydroxybenzene—being a red powder, melting at 240° C.

5-nitro-2-amino-methylbenzene the 1,3,5-di-(5'-nitromethylphenyl-2'-amino)- hydroxybenzene—being a red-brown powder, melting at 280° C. besides the 1,3,5-(5'-nitromethylphenyl - 2' - amino) - dihydroxybenzene—melting at 241° C. being a red-brown powder.

4-nitro-2-aminomethylbenzene the 1,3,5-di-(4'-nitromethylphenyl-2'-amino)-hydroxybenzene—being a brown powder, melting at 220° C.

4-chloro-3-nitroaniline the 1,3,5 - di-(4'chloro-3'-nitrophenylamino)-hydroxybenzene—being a yellow-brown powder, melting at 201° C.

6-chloro-3-nitroaniline the 1,3,5 - di-(6'-chloro-3'-nitrophenylamino)-hydroxybenzene—being a yellow-brown powder, melting at 236° C.

All these di-(nitroarylamino)-hydroxybenzenes dissolve in alcoholic caustic soda solution.

Instead of the before-mentioned methoxy compounds there may be used the corresponding ethoxy compounds or other alkoxy compounds, instead of methyl compounds the ethyl compounds or other alkyl compounds, instead of chlorine compounds other halogen compounds, for instance bromine compounds.

(10) 162 parts of phloroglucine (containing water of crystallization) are boiled in 15 times their weight of water with 300 parts of para-chloroaniline and 17 parts of sulfuric acid (specific gravity 1.83) for 16 hours under reflux. Any para-chloroaniline which has not been reacted upon is blown off from the solution which has been rendered alkaline; the 1,3,5,-di-(4'-chlorophenylamino)-hydroxybenzene, melting at 112° C., is obtained with a yield of 75% of the theoretical, whereas 1,3,5-tri-(4'-chlorophenylamino)-benzene is obtained as by-product with a yield of 14% of the theoretical.

By using 3.4-dichloro-aniline under corresponding working conditions, 1,3,5-di-(3',4'-dichlorophenylamino)-hydroxybenzene is obtained, whereas 2.5-dichloro-aniline or 2,4,5-trichloroaniline yields for the greatest part the 1,3,5-(2',5'-dichlorophenylamino) - dihydroxybenzene, easily soluble in alkalies and melting at 205° C., or the 1,3,5-(2',4',5'-trichlorophenylamino)-di-hydroxybenzene, melting at 170° C. respectively.

(11) 40.5 parts of phloroglucine (containing water of crystallization) and 90.25 parts of para-aminoquinoline-hydrochloride are dissolved in 500 parts of water and heated to boiling for 50 hours under reflux. After addition of caustic soda solution, the unchanged para-aminoquinoline is blown off by means of steam, the solution is filtered and rendered neutral by means of hydrochloric acid. The condensation product which consists of 1 mol. of phloroglucine and 2 mols. of para-aminoquinoline is soluble in alkalies as well as in mineral acids. The tetra-hydrochloride which may be obtained by means of concentrated hydrochloric acid represents a deep-red salt. When again redissolved from caustic alkali solution, the product obtained forms a yellow powder, melting at 175° C. to 180° C. with decomposition. The yield amounts to 60% of the theoretical.

We claim:

1. The process of preparing condensation products by replacing in phloroglucine at the most two hydroxy groups by aryl-amine radicals which comprises heating phloroglucine with a primary aromatic amine in the presence of water.

2. The process of preparing condensation products by replacing in phloroglucine at the most two hydroxy groups by aryl-amine radicals which comprises heating phloroglucine with a primary aromatic amine in the presence of water and of a mineral acid of the group consisting of hydrochloric acid and sulfuric acid.

3. The process of preparing condensation products by replacing in phloroglucine at the most two hydroxy groups by nitroarylamine radicals of the benzene series which comprises heating phloroglucine with a nitroarylamine of the benzene series in the presence of water and of a mineral acid of the group consisting of hydrochloric acid and sulfuric acid.

4. The process of preparing 1,3,5-di-(nitrophenylamino)-hydroxy benzene which comprises heating at boiling temperature a mixture of about 1 mol. of phloroglucine with about 2 to 3 mols of a nitro-aminobenzene in the presence of water and of hydrochloric acid.

5. The compounds of the general formula:

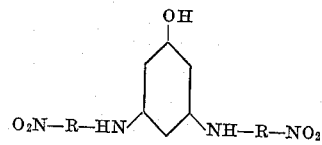

wherein the R's stand for radicals of the benzene series.

6. The compound of the formula:

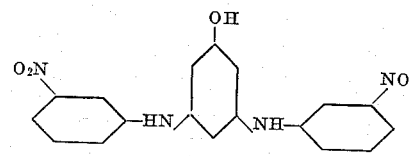

being when dry a red-brown powder, melting at 183° C., being soluble in hot dilute caustic soda solution.

7. The compound of the formula:

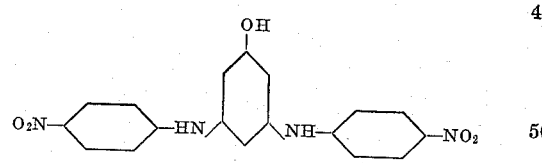

being when dry a brick-red powder, melting above 270° C., being soluble in alcoholic caustic soda solution.

8. The compound of the formula:

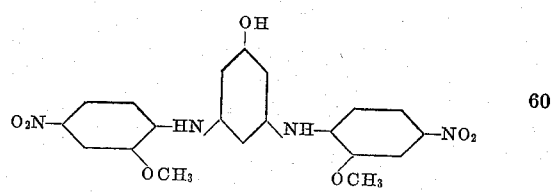

being when dry a red powder, melting at 240° C., being soluble in alcoholic caustic soda solution.

LEOPOLD LASKA.
OSKAR HALLER.
ARTHUR WERDERMANN.